L. STRAUSS.
Scissors and Shears.
No. 226,128. Patented Mar. 30, 1880.
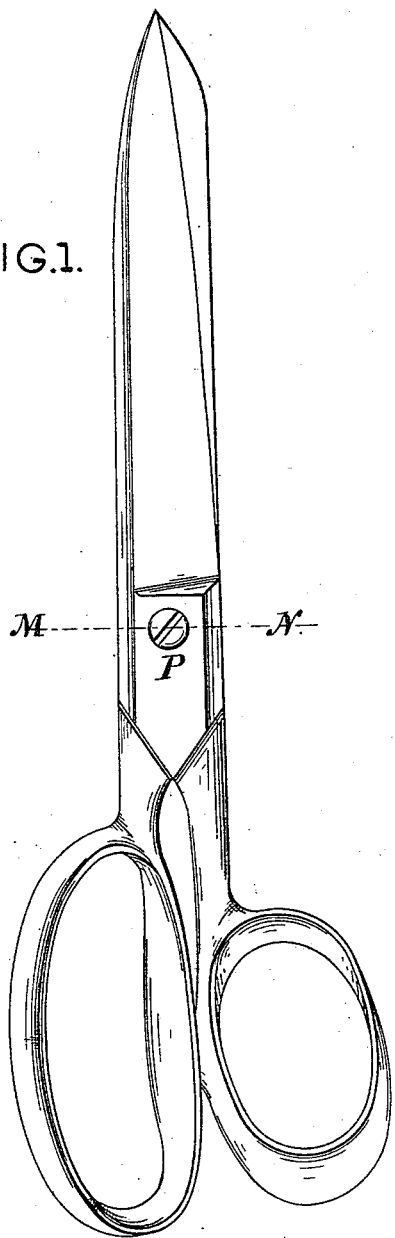
FIG.1.
FIG.2.
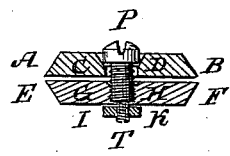
Witnesses
Saml R. Turner
Wm H Bates.
Inventor
Leopold Strauss
Chas S. Whitman
Atty.

UNITED STATES PATENT OFFICE.

LEOPOLD STRAUSS, OF MIDDLETOWN, CONNECTICUT.

SCISSORS AND SHEARS.

SPECIFICATION forming part of Letters Patent No. 226,128, dated March 30, 1880.

Application filed January 29, 1880.

*To all whom it may concern:*

Be it known that I, LEOPOLD STRAUSS, of the town of Middletown, in the county of Middlesex and State of Connecticut, have invented and made a new and useful Improvement in Scissors and Shears; and I do hereby declare that the following is a full, clear, and exact description thereof, reference being made to the accompanying drawings, which constitute a part of this my specification.

My invention consists of an improved bolt or pivot so constructed and set as not only to hold the blades together, as in common shears and scissors, but also to prevent the blades from easily working loose by continual wear.

Figure 1 represents a pair of scissors, in which is seen my improved bolt at P. Fig. 2 represents a vertical section of the same scissors formed by a plane cutting across the closed shanks at the dotted line M N in Fig. 1, and coincident with the axis of the bolt. In this Fig. 2, A C and D B are sections of the upper shank, E G and H F are sections of the lower shank, and P T is a section of my improved bolt, P being its screw-head, and T its opposite end, slightly diminished in diameter and carrying a nut, I K.

The upper part of the bolt, between its head and its junction with the diminished portion, has a right-hand screw-thread, which fits the female screw-thread of the aperture E H in the under shank, but turns freely in the aperture C D of the upper shank. The diminished portion of the bolt has a left-hand screw-thread, which is fitted to the female screw-thread of the nut I K.

The length of the bolt between its head and its junction with the diminished portion should be such that when the bolt is set in position the junction will not extend quite through the two shanks, but will leave a small space below to permit the nut to be brought snugly up to the face of the shank.

The bolt so constructed is set by pushing it through the upper shank and screwing it far enough into the lower shank to bring the cutting-blades into proper working position. Then the nut is turned on tightly to hold it in such position.

It is obvious that when the scissors are opened and shut the upper shank will move freely around the bolt, while any unscrewing of the bolt in the under shank by reason of friction will be checked by the opposite action of the nut.

The nut I K need not necessarily be square, as represented. It may be made of any neat and convenient shape, and instead of resting on the surface of the shank it may fit into a shallow recess cut around the aperture; but these are variations of finish and details not affecting my improvement.

I am aware that it is not new to construct the scissors with a single-threaded screw and pivot and nut for fastening and holding the blades together, for that is shown in the references cited.

Now, what I claim, and desire to secure by Letters Patent, is—

In a pair of shears or scissors, a female screw-threaded blade, in combination with the male-threaded pivot or bolt P, with reverse threads, and nut I K, substantially as described.

LEOPOLD STRAUSS.

Witnesses:
LOUIS STRAUSS,
CHAS. T. BUCK.